United States Patent [19]

Ehrenkaufer et al.

[11] 4,162,142

[45] Jul. 24, 1979

[54] TRITIUM LABELING OF ORGANIC COMPOUNDS DEPOSITED ON POROUS STRUCTURES

[75] Inventors: Richard L. E. Ehrenkaufer, Speonk; Alfred P. Wolf, Setauket, both of N.Y.; Wylie C. Hembree, Woodcliff Lake, N.J.

[73] Assignee: The United States of America as represented by the United States Department of Energy, Washington, D.C.

[21] Appl. No.: 920,412

[22] Filed: Jun. 29, 1978

[51] Int. Cl.[2] ........................ G01M 23/12; G21H 5/00

[52] U.S. Cl. ........................ 260/326.2; 424/1; 260/112.5 R; 260/112 R; 562/575; 23/230.6; 252/301.1 R

[58] Field of Search ........................ 23/230.6, 230.3; 195/103.7; 424/1, 1.5; 427/5

[56] References Cited

U.S. PATENT DOCUMENTS

| | | | |
|---|---|---|---|
| 3,486,935 | 12/1969 | Eyrich | 424/5 |
| 3,560,157 | 2/1971 | Anderson | 23/230.6 |
| 3,560,158 | 2/1971 | Benson | 23/230.6 |
| 3,623,840 | 11/1971 | Benson | 23/230.6 |
| 3,707,353 | 12/1972 | Kubigtowicz | 424/1 |
| 3,828,102 | 8/1974 | Fromageot | 23/230.6 |
| 3,902,849 | 9/1975 | Barak | 424/1 |

*Primary Examiner*—Sam Silverberg
*Attorney, Agent, or Firm*—R. V. Lupo; Leonard Belkin

[57] ABSTRACT

An improved process for labeling organic compounds with tritium is carried out by depositing the selected compound on the extensive surface of a porous structure such as a membrane filter and exposing the membrane containing the compound to tritium gas activated by the microwave discharge technique. The labeled compound is then recovered from the porous structure.

10 Claims, No Drawings

TRITIUM LABELING OF ORGANIC COMPOUNDS DEPOSITED ON POROUS STRUCTURES

BACKGROUND OF THE INVENTION

This invention was made under, or during, the course of, a contract with the United States Department of Energy.

Prior to the conception of the subject invention the present inventors and an associate conducted extensive experiments with tritium labeling reactions which led to the development of a method for the tritium labeling of a broad range of organic compounds of biological interest, including amino acids, peptides and proteins. The method is rapid, inexpensive and generally nondestructive so that the purification of the labeled material is minimized. The reaction apparatus comprises a closed system in which tritium gas activated by microwave discharge is recirculated to contact the organic compound undergoing labeling with tritium atoms. Both the prior method and apparatus have been amply described in two papers entitled, "A General Method of Tritium Labeling Utilizing Microwave Discharge Activation of Tritium Gas," in the Journal of Biological Chemistry, Vol. 248, pp 5532–5540 (Aug. 10, 1973), and "Stereochemical Consequences of Hydrogen Exchange as a Result of Tritium Atom Reactions on Solid Aliphatic Amino Acids," in Journal of Chemical Society, Vol. 99, pp 5005–5009 (July 1977), the entire disclosures of said papers being expressly incorporated herein by reference.

Various other studies of tritium incorporation into organic compounds have involved synthetic, recoil and exchange methods. However, none of these different attempts to produce complex tritium-labeled organic compounds of high specific activity have succeeded in attaining the results obtained by contacting the organic compound with tritium gas which is activated (dissociated) by microwave discharge. In spite of the superior results reported by the present inventors and an associate in the two aforesaid journals, further investigations have been conducted to increase the specific activity of organic compounds reacted with tritium gas activated by microwave discharge.

Accordingly, the principal object of this invention is to produce tritium-labeled organic compounds of increased specific activities.

Another object is to achieve high specific activities in organic compounds reacted with tritium gas activated by microwave discharge.

These and other objects and advantages of the invention will be apparent from the description which follows.

SUMMARY OF THE INVENTION

In accordance with this invention, an organic compound to be labeled by reaction with tritium gas activated by microwave discharge is first deposited on the extensive surface of a material permeated by a myriad of very fine pores. In most cases, deposition is advantageously achieved by dissolving the organic compound in a suitable volatilizable solvent, impregnating the highly porous material with the solution of the organic compound and removing the solvent from the impregnated material. The porous material on which the organic compound is deposited is then contacted with tritium gas activated by microwave (to produce tritium atoms) discharge to effect tritium-hydrogen exchange in the organic compound. Finally, the resultant tritium-labeled organic compound is recovered from the porous material by solvent extraction or other method appropriate for the particular organic compound and purified by suitable means.

Depending on the organic compound to be labeled, it may be possible to vaporize the compound and to condense its vapor on the highly porous material; this will obviate the use of a solvent. Also, deposition of an organic compound that is normally a liquid of very low viscosity may be effected by spraying or blotting the liquid on the porous material; care should be taken to avoid plugging or filling the fine pores of the material with an excess of the liquid organic compound.

The porous material is advantageously any of several available membrane filters which are thin polymeric or plastic structures having uniform pores. Such membrane filters are made from various polymers and have a variety of pore sizes. Improved labeling of organic compounds by tritium activated by microwave discharge is observed when the compounds are dispersed in materials having an average pore size not exceeding about 5 μm (micrometer). Experiments over a range of pore sizes from about 0.2 μm to about 5 μm have produced satisfactory results and an average pore size of about 0.5 μm gives optimum tritium-labeling of many organic compounds. All pore sizes tested to date have shown some effectiveness.

The polymers used to make porous materials suitable for this invention include polyvinyl chloride, polytetrafluoroethylene, polyamides, acrylonitrile, cellulose acetate and cellulose nitrate. For many organic compounds, porous materials made of the cellulose esters are preferred. The porous material may be formed from two or more plastics, such as polytetrafluorethene bonded to a polyethylene net.

It is also advisable to deposit a very thin coating of the organic compound on the porous material to ensure intimate contact of the activated tritium gas with the organic compound. Approaching a monomolecular film of the organic compound appears to be a desirable goal in dispersing the compound in the porous material.

Suitable reaction conditions including pressure, temperature, microwave power, tritium cycling rate and time are well known in the prior art and more particularly are disclosed in the two aforesaid journals. The reaction system or apparatus for carrying out the labeling of organic compounds with tritium gas activated by microwave discharge is likewise known.

DESCRIPTION OF PREFERRED EMBODIMENTS

EXAMPLE 1

Comparative tests were made in the tritium-labeling of GnRH (the decapeptide pyroGlu-His-Trp-Ser-Tyr-Gly-Leu-Arg-Pro-GlyNH$_2$, gonadotropin releasing hormone). A glass tray, 45 mm (millimeter) in diameter and having a surface roughened by sand-blasting, was filled with 200 μl (microliter) of aqueous solution of GnRH containing 1.00 mg (milligram) of GnRH. The water was slowly evaporated from the glass tray to leave a thin deposit of GnRH therein. Another 200 μl of aqueous solution of the same organic compound was applied dropwise to a membrane filter made of mixed esters of cellulose and having a diameter of 25 mm. The membrane filter was obtained from Millipore Corporation in Bedford, Massachusetts, and is identified in the Millipore catalog by No. GSWP 025 00. This membrane has a pore size of 0.22 μm. The water was evaporated from the completely wetted membrane under vacuum in a desiccator containing silica gel to leave 1.04 mg of GnRH dispersed in the membrane.

Each of the two samples of GnRH was individually exposed for 15 minutes in a modification of the labeling system described in the aforesaid journal of 1977. Two Ci (curie) of tritium gas at a pressure of 4 Torr Hg was activated with 30 watts of microwave power and circulated in the labeling system with the pump pulsing at 190 cycles per minute.

The thus treated GnRH was removed from the glass tray and from the cellulosic membrane by water and the aqueous solution in each case was subjected to the same sequence of chromatographic steps to eliminate impurities and yielding purified GnRH.

The tritium-labeled GnRH recovered from the cellulosic membrane had a specific activity of 647 mCi per mmol (millicurie per millimol) while the GnRH recovered from the glass tray had a specific activity of 17 mCi per mmol. Thus, the use of the membrane filter to support GnRH during its exposure to activated tritium gas yielded the corresponding tritium-labeled compound with a specific activity 38 times the specific activity of the same compound exposed to activated tritium while supported on the glass tray. This increased specific activity was obtained in spite of the fact that the membrane filter was only 25 mm in diameter and the glass tray had the larger diameter of 45 mm or a nominal surface area more than 3 times that of the membrane filter.

EXAMPLE 2

Using the same type of membrane filter specified in Example 1 and following the procedures of Example 1, 0.42 mg of GnRH was deposited on one celulosic membrane and 0.10 mg of the same compound on another membrane. Each membrane was contacted with activated tritium under the conditions set forth in Example 1 and purified tritium-labeled GnRH was recovered from each membrane. The product obtained from the membrane which originally supported 0.42 mg of GnRH had a specific activity of 2163 mCi per mmol while the product from the other membrane had a specific activity of 3182. Comparing these results with the membrane of Example 1, it is evident that as the amount of GnRH deposited on each membrane decreased from 1.04 to 0.42 to 0.10 mg, the specific activity of the tritium-labeled compound recovered from these membranes increased from 647 to 2163 to 3182 mCi per mmol. Accordingly, the importance of minimizing the film thickness of the compound dispersed in the cellulosic membrane prior to exposure to activated tritium is indicated.

EXAMPLE 3

To the same type of cellulosic membrane filter with a pore size of 0.22 μm which was used in Example 1, except that it had a diameter of 47 mm, was applied dropwise 200 μl of aqueous solution containing 0.80 mg of L-valine. Two other membrane filters differing from the first only in pore size had a pore size of 0.45 μm and 1.2 μm. These two membrane filters received individually 0.80 mg of L-valine by the application of its aqueous solution as already described. The water was evaporated from each of the three membrane filters under vacuum in a desiccator containing selica gel.

With the tritium-labeling system and the same reaction conditions of Example 1 except time which was reduced to 5 minutes, each of the three cellulosic membranes was contacted with activated tritium gas. The tritium-labeled L-valine recovered from each of the membranes showed the following specific activities:

| Membrane with Pore Size (μm) | Specific Activity (mCi per mmol) |
|---|---|
| 0.22 | 59.7 |
| 0.45 | 87.4 |
| 1.2 | 14.7 |

Thus, for a cellulosic membrane an average pore size of approximately 0.5 μm best promotes the labeling of L-valine exposed to tritium gas activated by microwave discharge.

EXAMPLE 4

To three membrane filters, 47 mm in diameter and made of mixed esters of cellulose with an average pore size of 0.45 μm (Millipore catalog No. HAWP 047 00), L-proline was applied in different amounts. One filter received 200 μl aqueous solution containing 100 μg of L-proline, another filter reviewed the same volume of aqueous solution but containing 1000 μg of L-proline and the third filter received the same volume of aqueous solution but containing 10,000 μg of L-proline. Water was evaporated from the three filters as described in Example I and each membrane filter was contacted with activated tritium gas in the apparatus and under the reaction conditions specified in Example 3. The specific activities of the purified tritium-labeled L-proline received from the three filters were:

| Filter with L-Proline | Specific Activity |
|---|---|
| 100 μg | 250.0 mCi per mmol |
| 1000 μg | 111.5 mCi per mmol |
| 10,000 μg | 21.2 mCi per mmol |

These results indicate the desirability of avoiding a thick film of the compound on the porous surface of the cellulosic membrane.

EXAMPLE 5

Membrane filters of different compositions identified herebelow were individually impregnated with 200 μl of aqueous solution containing 1.30 mg of L-proline. The same volume of aqueous solution of L-proline was deposited on a glass tray having a diameter of 45 mm. Each filter was 47 mm in diameter and unless otherwise specified had a pore size of 0.45 μm. The water was evaporated from the filters and the glass tray as described in Example 1 and the filters and the glass tray were individually contacted with tritium activated by microwave discharge in the apparatus and under the reaction conditions of Example 3. The specific activities of the purified tritium-labeled L-proline recovered from the different filters and the glass tray were:

| Manufacturer's Designation | Membrane Composition | Specific Activity of L-Proline (d) (mCi per mmol) |
|---|---|---|
| (G) Metricel GN-6 | Mixture of cellulose acetate and cellulose nitrate | 86.9 |
| (G) Metricel GA-6 | Cellulose triacetate (a) | 253. |
| (G) Metricel TCM-200 | Cellulose triacetate (b) | 332. |
| (G) Metricel Alpha-6 | Regenerated cellulose | 191. |
| (G) Metricel VM-1 | Polyvinyl Chloride (c) | 59.5 |
| (G) Metricel DM-450 | Copolymer acrylonitrile and polyvinylchloride | 12.6 |
| (G) Acropor AN-450 | Same copolymer on nylon web | 128. |
| (S) SM 111-06 | Cellulose acetate | 87.4 |
| (S) SM 113-06 | Cellulose nitrate | 311. |
| (S) SM 116-06 | Regenerated cellulose | 8.0 |
| (S) SM 119-06 | Polyamide | 29.0 |
| (S) SM 128-06 | Polyvinylchloride | 12.3 |
| (SS) BA 85 | Nitrocellulose | 401. |
| Glass tray | | 2.4 |

(G) Gelman Instrument Co., Ann Arbor, Mich.
(S) Sartorius Filters, Inc., South San Francisco, Cal.
(SS) Schleicher & Schuell, Inc., Keene, N.H.
(a) Impregnated with starch-like cellulose material as wetting agent.
(b) Pore size of 0.20 μm.
(c) Pore size of 5.0 μm.
(d) Specific Activity after suitable purification.

The specific activities of the tritium-labeled L-proline recovered from the various membranes listed above were all higher than that of the tritium-labeled L-proline removed from the glass tray. Even the poorest membrane (SM 116-06) made of regenerated cellulose more than tripled the specific activity of tritium-labled L-proline exposed on the glass tray. However, a regenerated cellulose membrane (Metricel Alpha-6) made by another manufacturer increased the specific activity of tritium-labeled L-proline by a multiple of 80. Also, the cellulosic membranes were generally more effective than the non-cellulosic membranes in facilitating the labeling of L-proline by reaction with tritium gas activated by microwave discharge. It is clear that by simple tests the determination can be made as to the optimum type of membrane to be used in accordance with this invention in the tritium-labeling of any given organic compound. Obviously, for L-proline the best membrane (BA 85) of those tested increased the specific activity of 2.4 mCi per mmol for the tritium-labeled organic compound removed from the glass tray to 401 mCi per mmol; the latter specific activity is 167 times the former activity.

Those skilled in the art will visualize variations of the invention without departing from its spirit and scope. Accordingly, only such limitations should be imposed on the scope of the invention as are set forth in the appended claims.

What is claimed is:

1. In the process of labeling an organic compound with tritium by reacting said compound with tritium gas activated by microwave discharge, the improvement of enhancing the desired reaction, which comprises depositing a film of said compound on the extensive surface of permeable material having very fine pores, and contacting said compound while deposited on said permeable material with tritium gas activated by microwave discharge and recovering the resulting tritium labeled organic compound from said permeable material.

2. The process of claim 1 wherein the permeable material is a membrane filter.

3. The process of claim 1 wherein the permeable material is a cellulosic membrane filter.

4. The process of claim 1 wherein the permeable material is a polymeric membrane having an average pore size not exceeding about 5 μm.

5. The process of claim 1 wherein the organic compound is dispersed in the permeable material by impregnating said permeable material with a solution of said compound in a volatilizable solvent and removing said solvent from said permeable material to leave said compound dispersed therein.

6. The improved process of labeling an organic compound with tritium, which comprises depositing a film of said compound on the extensive surface of a membrane filter having an average pore size not exceeding about 5 μm, exposing said membrane filter with the deposit of said compound thereon to tritium gas activated by microwave discharge, and recovering the resulting tritium-labeled organic compound from said membrane filter.

7. The process of claim 6 wherein the organic compound is selected from the group consisting of amino acids, peptides and proteins.

8. The process of claim 6 wherein the membrane filter is composed of at least one polymer selected from the group consisting of cellulose esters, polyamides, polytetrafluonethylene, polyvinyl chloride, acrylonitrile and regenerated cellulose.

9. The process of claim 8 wherein the organic compound is an amino acid and the membrane filter has an average pore size in the range of about 0.2 μm to about 5 μm.

10. The process of claim 7 wherein the membrane filter is composed of at least one cellulose ester.

* * * * *